(12) United States Patent
Bradbrook et al.

(10) Patent No.: US 6,902,229 B2
(45) Date of Patent: Jun. 7, 2005

(54) FIXING

(75) Inventors: Dean Bradbrook, Wakefield (GB); Paul Novak, Leeds (GB)

(73) Assignee: Thule Automotive Limited, Rotherham (GB)

(*) Notice: Subject to any disclaimer, the term of this patent is extended or adjusted under 35 U.S.C. 154(b) by 0 days.

(21) Appl. No.: 10/896,915

(22) Filed: Jul. 23, 2004

(65) Prior Publication Data

US 2005/0029838 A1 Feb. 10, 2005

Related U.S. Application Data

(63) Continuation of application No. PCT/GB03/00161, filed on Jan. 17, 2003.

(51) Int. Cl.$^7$ .................................................. B60R 9/04
(52) U.S. Cl. ...................................... 296/210; 224/309
(58) Field of Search ................................ 296/210, 214; 403/367–370, 365; 224/309, 326

(56) References Cited

U.S. PATENT DOCUMENTS

| | | | | |
|---|---|---|---|---|
| 4,750,781 A | * | 6/1988 | Betteridge | .................. 296/214 |
| 4,899,917 A | * | 2/1990 | Bott | .......................... 224/326 |
| 5,699,944 A | | 12/1997 | Duran | |
| 6,158,637 A | * | 12/2000 | Fisch et al. | .................. 224/309 |
| 6,499,782 B2 | * | 12/2002 | Kwon | ........................ 296/1.02 |
| 6,592,176 B2 | * | 7/2003 | Lumpe et al. | .............. 296/210 |
| 6,623,068 B2 | * | 9/2003 | Wieschermann et al. | ... 296/210 |

FOREIGN PATENT DOCUMENTS

| | | |
|---|---|---|
| DE | 31 21 086 A | 12/1982 |
| DE | 31 33 932 A | 3/1983 |
| DE | 35 24 558 A | 1/1987 |
| DE | 37 36 028 C | 2/1989 |
| DE | 39 32 193 A | 4/1991 |
| DE | 92 09 769 U | 10/1992 |
| DE | 197 06 611 C | 4/1998 |
| DE | 198 54 221 A | 5/2000 |
| EP | 0 950 569 A | 10/1999 |

* cited by examiner

Primary Examiner—Patricia L. Engle
(74) Attorney, Agent, or Firm—Venable LLP; Michael A. Sartori; Daniel G. Vivarelli, Jr.

(57) ABSTRACT

A fixing 4 for a vehicle roof comprises a foot portion 2 having a projecting boss 18, which boss 18 is adapted to project through an opening in a vehicle roof, the fixing 4 also comprising engagement means adapted to be received in an opening 28 in the boss 18, and fastening means 6 also adapted to be received in the opening 28 in the boss 18 to thereby secure the engagement means 7 in position and thereby prevent removal of the boss 18 from said opening in the vehicle roof.

21 Claims, 2 Drawing Sheets

FIXING

This application is a Con. of PCT/GB03/00161 filed Jan. 17, 2003.

FIELD OF THE INVENTION

The present invention relates to fixings and particularly, although not exclusively, to fixings for fastening a roof rack to the roof of a motor vehicle.

BACKGROUND OF THE INVENTION

Roof racks for carrying items on the roof of a vehicle generally consist of at least two roof rail extrusions which extend in parallel with each other along each side of the roof. Roof rail feet are attached to either end of each roof rail extrusion and are firmly secured to the vehicle roof.

EP 0,950,569 B1 discloses a device for securing a roof rail foot to a vehicle roof. Unfortunately, the device consists of a number of interacting components and is therefore expensive to provide and often prone to failure.

It is one aim of embodiments of the present invention to address the above problems and to provide an improved fixing for fastening a roof rail foot to a vehicle roof.

SUMMARY OF THE INVENTION

According to a first aspect of the present invention, a fixing for a vehicle roof comprises a foot portion having a projecting boss, which boss is adapted to project through an opening in a vehicle roof, the fixing also comprising engagement means adapted to be received in an opening in the boss, and fastening means also adapted to be received in the opening in the boss to thereby secure the engagement means in position and thereby prevent removal of the boss from said opening in the vehicle roof. The fixing may comprise a roof rail foot. The boss may be adapted to project from an upper surface of the vehicle roof to a lower surface thereof.

Preferably, the roof comprises a roof space between inner and outer roof panels. Preferably, the roof rail foot extends through the outer roof panel and into the roof space. Preferably, the boss comprises a substantially circular outer circumference. Preferably, the opening in the boss is a hole or slot, which hole or slot is preferably substantially circular in cross-section.

The fixing may comprise a boss insert adapted to be received in the opening in the boss. Preferably, the boss insert is adapted to engage with the engagement means thereby forming an opening in which the fastening means may be received. Preferably, the boss insert comprises an inner surface facing the opening extending through the boss, said inner surface preferably having a substantially curved inner profile. Preferably, the inner surface describes part of the circumference of a circle, which circle is coaxial with the opening extending through the boss. Preferably, the inner surface defines a semi-circle when viewing the boss insert along a longitudinal axis thereof. The boss insert may be suitably shaped to define a first part of an annulus or ring formed by co-engagement with the engagement means.

Preferably, the engagement means comprises abutment means and a protrusion extending outwardly therefrom. Preferably, the abutment means comprises a head having an aperture extending therethrough, said aperture being adapted to receive the fastening means. Preferably, the protrusion is wider at a tip end then at an end adjacent the head. Preferably, the protrusion comprises an inner surface adapted to face the hole opening through the boss, said inner surface preferably having a substantially curved inner profile. Preferably, the inner surface defines a semi-circle when viewing the engagement means along a longitudinal axis thereof. Preferably, the engagement means is suitably shaped to define a second part of an annulus or ring formed by co-engagement with the boss insert.

Preferably, the engagement means is adapted to be inserted into the opening extending through the boss. Preferably, the engagement means engages with the boss insert. Preferably, the co-engagement of the boss insert and the engagement means define the complete annulus. Preferably, the opening which is preferably circular in cross-section is formed between the inner surfaces of the boss insert and engagement means. The inner surface of the boss insert may comprise a screw thread. The inner surface of the engagement means may comprise a screw thread.

Preferably, the inner surfaces are substantially unthreaded. Preferably, the fastening means is operable to cut a thread in the inner surface of the boss insert and preferably the inner surface of the engagement means upon axial displacement therealong preferably through the opening defined by the co-engagement of the boss insert and the engagement means. Preferably, the fastening means is self-tapping, and is preferably a screw or bolt.

The fixing may further comprise spacing means adapted to maintain the boss insert and the engagement means in position next to each other. Preferably, the spacing means comprises a washer having an opening through which the boss insert and the protrusion of the engagement means may extend. Preferably, the spacing means is resilient.

According to a second aspect of the present invention, there is provided a vehicle comprising a roof rail foot attached to a vehicle roof by a fixing according to the first aspect.

All the features described herein may be combined with any of the above aspects, in any combination.

BRIEF DESCRIPTION OF THE DRAWINGS

For a better understanding of the invention, and to show how embodiments of the same may be carried into effect, reference will be made, by way of example, to the accompanying drawings, in which.

DETAILED DESCRIPTION OF THE PRESENT INVENTION

Figure 1:
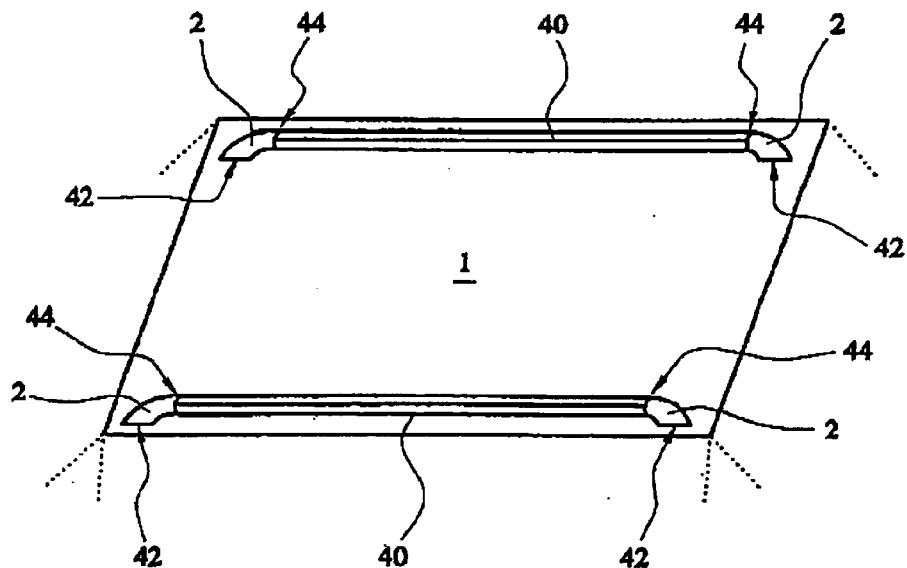
FIG. 1 shows a schematic perspective view of a roof rail system.

Referring to FIG. 1, there is shown a roof 1 of a vehicle. For clarity, the majority of the vehicle is not shown in FIG. 1. A roof rail system is shown in position on the roof 1 of the vehicle, and consists of two aluminium roof rail extrusions 40 which extend in parallel with each other along each side of the roof 1. A roof rail foot 2 is attached by suitable means to either end of the roof rail extrusions 40 at attachment sites 44. The roof rail feet 2 are firmly secured to the roof 1 by 'tolerance' fixing devices 4 at site 42 as shown in FIG. 2.

Figure 2:
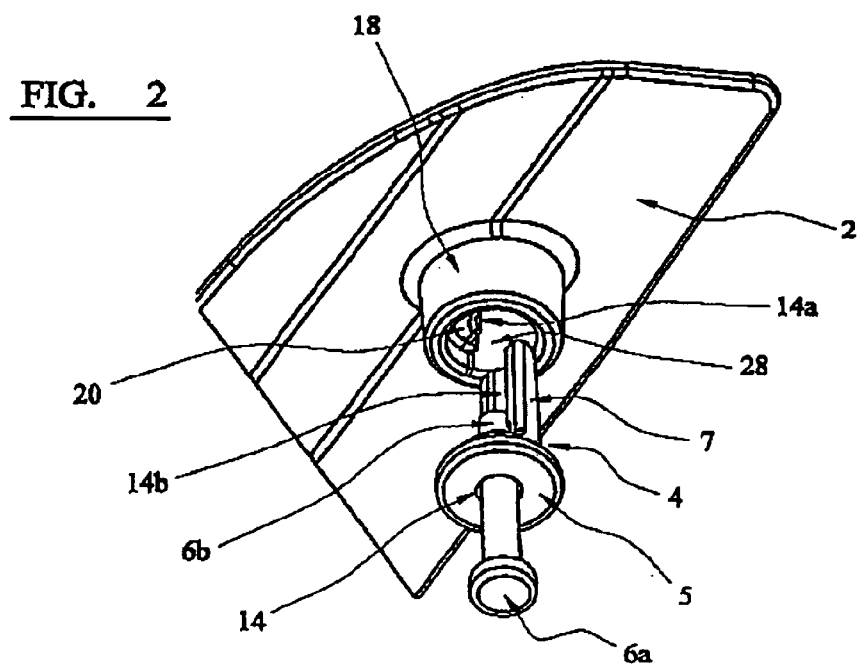
FIG. 2 shows a schematic perspective partial view from below of a roof rail foot and fastening device therefor.

Referring to FIG. 2, there is shown an enlarged view of the underside of a section of one of the roof rail feet 2 shown in FIG. 1. FIG. 2 shows a 'tolerance' fixing device 4 used to secure the roof rail foot 2 to the vehicle roof 1.

Figure 3:
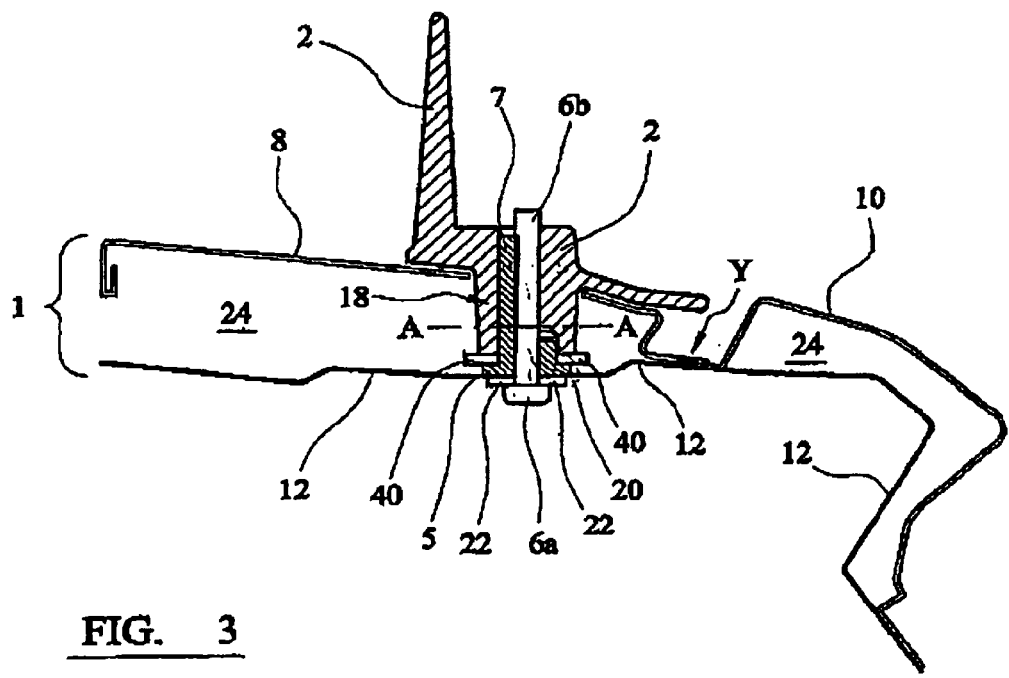
FIG. 3 shows a schematic cross-sectional view of the fastening device and roof rail foot.

Referring to FIG. 3, there is shown a cross-sectional view through the vehicle roof 1. The vehicle roof 1 consists of an upper roof panel or roof skin 8, and a vehicle inner body structure or roof reinforcement 12 which are attached to a vehicle body side panel 10 at attachment site Y. Space regions 24 are formed in between the upper roof panel 8 and the inner body structure 12, and the upper roof panel 8 and the vehicle body side panel 10.

Referring to FIGS. 2 and 3, a circular boss 18 having an aperture 28 therethrough is shown extending downward from the underside of the roof rail foot 2. The roof rail foot 2 is attached to the roof 1 of the vehicle by extending the boss 18 through an aperture (not shown) in the upper vehicle roof panel 8 so that the underside of the roof rail foot 22 tightly abuts the outside of the vehicle roof panel 8. The boss 18 extends into the space region 24. The roof rail foot 2 is then secured in position tightly against the roof panel 8 by the co-engagement of first and second halves 20 and 7 of the tolerance fixing device 4 which are described in more detail hereinafter.

Referring to the Figures, the first half 20 of the tolerance fixing device 4 consists of a 'C'-shaped nub 20 having a curved inner surface 14a which is inserted into the boss 18. The nub 20 is semi-circular in cross-section and the curved inner surface 14a faces the aperture 28 extending through the boss 18. As shown in FIG. 2, the second half 7 of the tolerance fixing device 4 consists of a circular head member 5 having an aperture 14 extending therethrough, and an elongate projection 7 which extends therefrom. The projection 7 is also 'C'-shaped or semi-circular in cross-section and defines a curved inner surface 14b which faces the aperture 28 extending through the boss 18.

Figure 4:
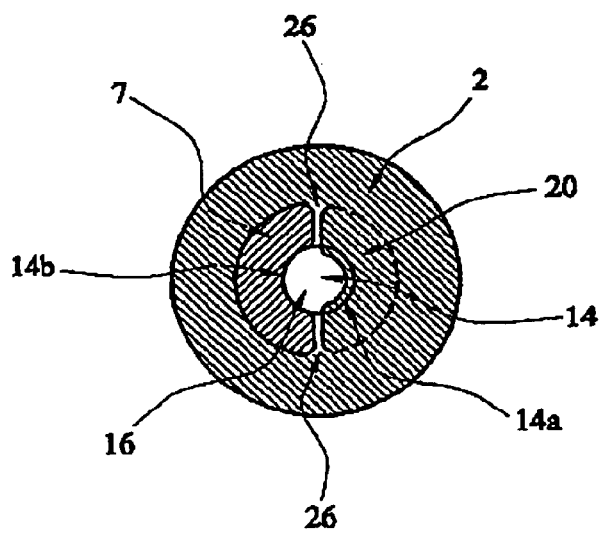
FIG. 4 shows a schematic view of the fastening device and roof rail foot along the line A—A shown in FIG. 3.

As shown most clearly in FIG. 4, when engaging with each other, the corresponding shapes of the first and second semi-circular halves 20 and 7 of the fixing device 4 define an annulus thereby producing a central channel 14 therebetween. The inner surfaces 14a,14b are both curved so that, when the first and second halves 20 and 7 engage with each other, the channel 14 defined therebetween is substantially circular in cross section. In effect, the two curved inner surfaces 14a,14b provide one half of a complete channel in which a screw or bolt 6a,6b is accommodated.

The method by which the roof rail foot 2 is secured in position on the roof 1 will now be described with reference to the Figures. The boss 18 of the foot 2 is first inserted into the aperture present in the upper vehicle roof panel 8. The first half and second halves of the fixing device 20 and 7 are then inserted from below into the aperture 28 in the boss 18 thereby forming the complete annulus 20,7 resulting in the formation of the channel 14 therebetween.

As shown in FIG. 3, a washer 40 manufactured out of a resilient material is used to maintain the two halves 7,20 of the fixing device 4 in position in the aperture 28 in the boss. The washer 40 is 4 mm thick and is covered with a sticky material on the side which faces the boss 18 of the roof rail foot 2. The washer 40 is passed over the elongate projection 7 of the second half 7 until it abuts the head member 5 with the sticky side of the washer 40 facing away therefrom. The first half 20 of the fixing device is then inserted through the washer 40 so that the two halves 20 and 7 are maintained in position next to each other defining the channel 14 therebetween.

Because the two halves of the fixing device 7,20 are located vertically inside the aperture 28 of the boss 18, they would tend to fall out under gravity unless otherwise held in position. Therefore, the washer 40 sticks to the underside of the boss 18 and prevents the two halves of the fixing device 20 and 7 from falling out.

The channel 14 formed by the inner surfaces 14a,14b is then aligned with a suitably sized aperture (not shown) present in the vehicle inner body structure 12. A second washer 22 is aligned with the channel 14 on the inner side of the inner body structure 12. Finally, a screw or bolt having a head 6a and shank 6b is inserted through the washer 22 and into the channel 14. The screw or bolt 6a,6b is self-tapping and, as a roof rack installer drives the screw or bolt 6a,6b into the channel 14 with a screw driver, the screw shank 6b cuts its own thread 16 on the inner surfaces 14a,14b of the channel 14 as shown in FIG. 4. The screw or bolt 6a,6b is driven into the channel 14 thereby securing the two halves 20,7 of the fixing device 5 together. This in turn secures the roof rail foot 2 tightly against the upper vehicle roof panel 8. The benefit of the two semi-circular halves 20 and 7 of the fixing device 4 being of different lengths is that they are unable to rotate with respect to each other in the aperture 28 in the boss and, hence, their shape facilitates the screwing of the screw or bolt 6a,6b therein.

The length of the boss 18 is approximately the same as the width of the space region 24 between the upper roof panel 8 and the inner body structure 12 and, therefore, prevents the screw 6 from being overtightened which would damage the vehicle inner body structure 12. Any discrepancy in length may be taken up by the washer 40.

Advantages of the fixing device 4 reside in the effective attachment of a roof rail foot to a roof 1. The device fixing 4 is simple to use and cheap to manufacture. The washer 40 prevents the halves of the fixing device 4 from falling out of the boss 18 during installation. Finally, the fixing device 4 may be used to attach a roof rail foot 2 to the roof 1 of any vehicle irrespective of the distance between the vehicle outer roof skin 8 and the inner roof reinforcement 12 without internal tolerance problems arising.

The reader's attention is directed to all papers and documents which are filed concurrantly with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. A fixing for a vehicle roof comprises a foot portion having a projecting boss, which boss is adapted to project through an opening in a vehicle roof, the fixing also comprising engagement means adapted to be received in an opening in the boss, and fastening means also adapted to be received in the opening in the boss to thereby secure the engagement means in position and thereby prevent removal of the boss from said opening in the vehicle roof, wherein the fixing includes a boss insert adapted to be received in the opening in the boss and wherein the boss insert is shaped to define a first part of an annulus or ring formed by engagement with a part of the engagement means, which part forms a second part of the annulus or ring.

2. A fixing as claimed in claim 1, wherein the fixing comprises a roof rail foot.

3. A fixing as claimed in claim 1, wherein the boss is adapted to project from an upper surface of the vehicle roof to a lower surface thereof.

4. A fixing as claimed in claim 2, wherein the roof comprises a roof space between inner and outer roof panels.

5. A fixing as claimed in claim 4, wherein the roof rail foot extends through the outer roof panel and into the roof space.

6. A fixing as claimed in claim 1, wherein the boss insert is adapted to engage with the engagement means thereby forming an opening in which the fastening means may be received.

7. A fixing as claimed in claim 1, wherein the boss insert comprises an inner surface facing the opening extending through the boss, said inner surface having a substantially curved inner profile.

8. A fixing as claimed in claim 7, wherein the inner surface describes part of the circumference of a circle, which circle is coaxial with the opening extending through the boss.

9. A fixing as claimed in claim 7, wherein the inner surface defines a semi-circle when viewing the boss insert along a longitudinal axis thereof.

10. A fixing as claimed in claim 1, wherein the engagement means comprises abutment means and a protrusion extending outwardly therefrom.

11. A fixing as claimed in claim 10, wherein the abutment means comprises a head having an aperture extending therethrough, said aperture being adapted to receive the fastening means.

12. A fixing as claimed in claim 10, wherein the protrusion comprises an inner surface adapted to face the hole opening through the boss, said inner surface having a substantially curved inner profile.

13. A fixing as claimed in claim 12, wherein the inner surface defines a semi-circle when viewing the engagement means along a longitudinal axis thereof.

14. A fixing as claimed in claim 1, wherein the engagement means is adapted to be inserted into the opening extending through the boss.

15. A fixing as claimed in claim 1, wherein the engagement means engages with the boss insert.

16. A fixing as claimed in claim 1, wherein co-engagement of the boss insert and the engagement means define the complete annulus.

17. A fixing as claimed in claim 1, wherein the fastening means is operable to cut a theread in the inner surface of the boss insert and the inner surface of the engagement means upon axial displacement therealong.

18. A fixing as claimed in claim 1, wherein the fixing further comprises spacing means adapted to maintain the boss insert and the engagement means in position next to each other.

19. A fixing as claimed in claim 18, wherein the spacing means comprises a washer having an opening through which the boss insert and the protrusion of the engagement means extend.

20. A fixing as claimed in claim 18, wherein the spacing means is resilient.

21. A vehicle comprising a roof rail foot attached to a vehicle roof by a fixing according to claim 1.

* * * * *